(12) United States Patent  
Marshall et al.

(10) Patent No.: US 8,280,808 B2
(45) Date of Patent: Oct. 2, 2012

(54) MULTIPLE RATE LOAN

(75) Inventors: Edna Waters Marshall, Charlotte, NC (US); Lisa D. Curry, Warwick, RI (US); Ashley C. Hardy, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 12/847,441

(22) Filed: Jul. 30, 2010

(65) Prior Publication Data

US 2012/0030099 A1 Feb. 2, 2012

(51) Int. Cl.
*G06Q 40/00* (2012.01)
(52) U.S. Cl. ............................................ 705/39; 705/35
(58) Field of Classification Search ...................... 705/39, 705/35
See application file for complete search history.

(56) References Cited

U.S. PATENT DOCUMENTS

| | | | |
|---|---|---|---|
| 6,980,968 B1 * | 12/2005 | Walker et al. ................... | 705/38 |
| 7,299,007 B2 | 11/2007 | Eskin | |
| 7,401,731 B1 * | 7/2008 | Pletz et al. ................... | 235/380 |
| 7,540,411 B1 * | 6/2009 | Tannenbaum ................. | 235/380 |
| 7,689,504 B2 * | 3/2010 | Warren et al. .................... | 705/38 |
| 2003/0009402 A1 * | 1/2003 | Mullen et al. ................... | 705/35 |
| 2005/0075975 A1 | 4/2005 | Rosner et al. | |
| 2005/0209938 A1 * | 9/2005 | Czyzewski et al. ............. | 705/30 |
| 2006/0151598 A1 | 7/2006 | Chen et al. | |
| 2007/0260532 A1 | 11/2007 | Blake, III | |
| 2009/0099947 A1 * | 4/2009 | Boehm et al. .................... | 705/35 |
| 2010/0057574 A1 * | 3/2010 | Banerjee et al. ........... | 705/14.66 |

* cited by examiner

*Primary Examiner* — Sarah Monfeldt
(74) *Attorney, Agent, or Firm* — Michael A. Springs; Moore & Van Allen PLLC; Andrew D. Gerschutz

(57) ABSTRACT

Embodiments of the present invention relate to methods and apparatuses for implementing, in connection with a loan account, a loan management tool. In some embodiments, the method includes: storing information relating to a loan account associated with a borrower in a storage device, wherein a first interest rate is associated with the loan account, segmenting the loan account into at least a first spend category, and associating a second interest rate with the first spend category, wherein the second interest rate is different from the first interest rate. The method may also include receiving a payment comprising a first portion based on the first interest rate and a second portion based on the second interest rate, and applying a first portion of the payment to reducing a balance of the first spend category. The systems and methods of the present invention are used in connection with a HELOC account.

19 Claims, 12 Drawing Sheets

| Online Banking Sign Off |
|---|
| Locations • Mail • Help |
| Enter Keyword(s) [ ] 🔍 |

| Accounts | Bill Pay | Transfers | Investments | Customer Service |
|---|---|---|---|---|
| Account Overview | Account Details | Alerts | Open an Account | |

HELOC Account - 0001

Account: [HELOC - 0001 ▼] [Go]

| Reports | Manage Spend Category Limits | Manage Spend Category Payment |

View: [Set Spend Category Limits ▼]

Set Spend Category Limits
You may set up limits for each of your Spend Categories to help manage your spending and paydown within each limit. You will be able to view your performance against these limits on the Spend Category Limit vs. Actual Spending Chart.

Your Spend Category Limits will always add up to your total HELOC credit limit.

Transactions within your Spend Category that exceed the Spend Category Limit will be posted against the next available Spend Category as long as you have total HELOC line availability. We will alert you to adjust your Spend Category Limit or transaction Spend Category.

| Spend Category [Manage] | Spend Category Limit Amount |
|---|---|
| General Purpose | $ 100000 |
| Debt Consolidation | $ 25,000 |
| Our DIY Kitchen | $ 35,000 |
| College | $ 30,000 |
| ODP | $ 10,000 |
| Total | $ 200,000 |
| Uncategorized categorize these transactions | $ 0.00 |

[Save Changes]

FIG. 7A

Online Banking  Sign Off
Locations • Mail • Help
Enter Keyword(s)

Accounts | Bill Pay | Transfers | Investments | Alerts | Customer Service
Account Overview | Account Details | Open an Account HELOC Account - 0001        Account: HELOC - 0001  Go Reports | Manage Spend Category Limits | Manage Spend Category Payment Manage Spend Category Payments
You may manage payments for each of your Spend Categories. You will be able modify your payment amount, number of payments, or set a payoff date. You will also see your interest saved over paying your minimum monthly payment amount.

| My Spend Category Name | My Spend Category Monthly Payment % Allocation | My Spend Category Monthly Payment Amount |
|---|---|---|
| General Purpose | Balance $100,000 | ☒ |
| Debt Consolidation | 120  Enter months to pay | ○ |
| Our DIY Kitchen | or | ○ |
| College | 1,122.80  Amount each month | ○ |
| ODP | or  Payoff Date | ○ |
| Total Spend Category Payment | You will save $10,744 in interest | 80 |

Use What If Calculator                          Save Changes

| Accounts | Bill Pay | Transfers | Investments | Customer Service |
| --- | --- | --- | --- | --- |

Account Overview | Account Details | Alerts | Open an Account

HELOC Account - 0001

Account: [HELOC - 0001 ▾] [Go]

| Reports | Manage Spend Category Payments | Manage Spend Category Limits | Manage Spend Category Payment |

Manage Spend Category Payments
You may manage payments for each of your Spend Categories. You will be able modify your payment amount, number of payments, or set a payoff date. You will also see your interest saved over paying your minimum monthly payment amount.

| My Spend Category Name | My Spend Category Monthly Payment % Allocation | My Spend Category Monthly Payment Amount |
| --- | --- | --- |
| General Purpose | 34 % | $ 1,122.80 ⊙ |
| Debt Consolidation | 45 % | $ 1,500 ⊙ |
| Our DIY Kitchen | 6 % | $ 200 ⊙ |
| College | 15 % | $ 500 ⊙ |
| ODP | 0 % | $ 0 ⊙ |
| Total Spend Category Payment | 100 % | $ 3,322.80 |

Use What If Calculator                                    [Save Changes]

| Accounts | Bill Pay | Transfers | Investments | Alerts | Customer Service |

Account Overview | Account Details | Open an Account

HELOC Account - 0001

Account: [HELOC - 0001 ▼] [Go]

Heloc Options
Manage Spend Categories
My House
What If Calculator
Manage Alerts
Request Line Increases
Apply Add-It-Up to my HELOC

Real Estate Center

Home Name: HOME 1

Home Type: HOME VALUE
HOME VALUE ESTIMATE : $600,000
Value Range:
Charts: Home Value Change
Compare your home to others Edit home
Mortgage: $203,000
Home Equity Line of Credit: $200,000
Total Combined Loan Amounts: $403,000
Combined Loan to Value (CLTV): 67.17%
Estimated equity in home: $197,000
Available for line
increase (85% CLTV): $107,000

Home Name: HOME 2

Home Type: HOME VALUE
HOME VALUE ESTIMATE : $300,000
Value Range:
Charts: Home Value Change
Compare your home to others Edit home
Mortgage: $270,000
Home Equity Line of Credit: $50,000
Total Combined Loan Amounts: $320,000
Combined Loan to Value (CLTV): 107%
Estimated equity in home: ($20,000)
Available for line
increase (85% CLTV): N/A

[Add a Home]

Online Banking  Sign Off
Locations • Mail • Help
[Enter Keyword(s)] 🔍

FIG. 8B

MULTIPLE RATE LOAN

FIELD

In general terms, embodiments of the present invention relate to methods and apparatuses for implementing a tool to manage a loan, such as for example a home equity line of credit, and in particular, embodiments of the present invention relate to methods and apparatuses for allowing consumers to manage both the spending of funds obtained through a loan, as well as the repayment of funds spent, including the terms of repayment.

BACKGROUND

A home equity line of credit (referred to herein as a "HELOC") is a line of credit extended to a consumer from a lender, such as a bank, where the collateral for amounts borrowed under the line of credit is the borrower's equity in his or her home. Unlike a typical loan where the entire loan amount is deposited with the borrower at once, a HELOC sets a credit limit and a particular period of time (a "term"), and allows the borrower to draw funds from the line of credit at his or her discretion up to the credit limit during the specified term. Only those funds that are drawn from the HELOC bear interest until they are repaid, which repayment may occur at any time during the term, with minimum amounts generally due periodically depending on the terms of the HELOC. Thus, a HELOC somewhat mimics a credit card account more than a typical loan. A key difference between a HELOC and other lines of credit and loan instruments is that the underlying collateral for the loan is the home.

Many homeowners secure a HELOC with the intention of only using the borrowed funds for certain major items that are either necessary or provide considerable value, such as education, home improvements, debt consolidation, or medical bills. These borrowers also often have specific ideas about budgeting the HELOC funds and managing exactly how and when they will withdraw, spend, and repay funds from their HELOC. However, there is no readily available tool that assist borrowers with exploring the various options they have with regard to budgeting, spending, and repayment. Because their personal budgeting strategies and spending history are not integrally connected to their HELOC account, borrowers may lose sight of or inaccurately apply personal budgetary restrictions and repayment plans. Additionally, they may feel overwhelmed by the numerous statements and other paperwork relating to their various financial accounts, mortgages, and HELOC account, which can prevent them from being exposed to restructuring options and payment terms applicable to their HELOC that would help them reach their financial goals. Indeed, many borrowers may miss the opportunity to add additional credit to their HELOC in the event the value of their home increases. Accordingly, there is a need to provide methods and apparatuses that help borrowers better manage the spending and repayment of their HELOC funds, and in particular, provide borrowers with an easy way to budget and accurately track spending of HELOC funds, determine the best payment strategies and payment terms for their HELOC, and learn about other options with regard to restructuring or adding additional credit to their HELOC.

SUMMARY OF SELECTED EMBODIMENTS OF THE PRESENT INVENTION

In general terms, embodiments of the present invention relate to methods and apparatuses for implementing, in connection with a loan account, a loan management tool. In particular, some embodiments of the present invention provide a computer-implemented method including the following steps: storing information relating to a loan account associated with a borrower in a storage device, wherein a first interest rate is associated with the loan account, segmenting the loan account into at least a first spend category, and associating a second interest rate with the first spend category, wherein the second interest rate is different from the first interest rate. In some embodiments, the method further includes receiving a payment comprising a first portion based on the first interest rate and a second portion based on the second interest rate, and applying a first portion of the payment to reducing a balance of the first spend category. In some embodiments, the method further includes applying a second portion of the payment to reducing a partial balance of the loan account, wherein the partial balance of the loan account does not include the balance of the first spend category. According to some embodiments, the method also includes receiving instructions from the borrower regarding allocating the payment between the balance of the first spend category and the balance of the loan account. In some embodiments, the instructions are stored in connection with the loan account prior to receipt of the payment.

In some embodiments of the present invention, the method further includes generating a billing statement containing an overall balance of the loan account, wherein the overall balance comprises a first interest portion based on the first interest rate and a second interest portion based on the second interest rate. In some embodiments, the method further includes allocating purchases made by the borrower to the at least one spend category. In some embodiments, allocating purchases includes receiving an indication that a purchase has been made using funds drawn from the loan account, associating the purchase with one of the one or more spend categories, and recording in connection with the first spend category an increase in a balance of the spend category equal to the amount of the purchase. In some embodiments, receiving an indication that a purchase has been made includes receiving the indication from a device effectuating the purchase. In some embodiments, associating the purchase includes associating the purchase with one of the one or more spend categories based on information provided by the device. In some embodiments, associating the purchase comprises associating the purchase with one of the one or more spend categories based on input received from the borrower.

According to some embodiments, segmenting the loan account into at least a first spend category includes segmenting the loan account into one or more spend categories where one of the spend categories is one of education, home improvement, debt consolidation, miscellaneous, and medical bills. In some embodiments, the method further includes setting in connection with each spend category a spending limit, and generating a notification to the borrower when the difference between a balance of one of the one or more spend categories and the spending limit for the spend category is zero or is less than a predefined amount. In some embodiments, the method further includes receiving from the borrower an input, and calculating, based on the input, an output, wherein the output comprises at least one of the anticipated payoff date, the monthly payment amount, and the total saved interest. In some embodiments, receiving from the borrower an input includes receiving an input comprising one of the desired payoff date, the desired monthly payment amount, and the total saved interest. In some embodiments, the loan account is a line of credit account. In some embodiments, the loan account is a HELOC account.

Some embodiments of the present invention provide a computer-implemented method including the following steps: storing information relating to a HELOC account associated with a borrower in a storage device, wherein a first interest rate is associated with the HELOC account, segmenting the loan account into at least a first spend category, associating a second interest rate with the first spend category, wherein the second interest rate is different from the first interest rate, receiving a payment comprising a first portion based on the first interest rate and a second portion based on the second interest rate, and applying a first portion of the payment to reducing a balance of the first spend category. In some embodiments, the method further includes applying a second portion of the payment to reducing a partial balance of the loan account, wherein the partial balance of the loan account does not include the balance of the first spend category. In some embodiments, the method further includes receiving instructions from the borrower regarding allocating the payment between the balance of the first spend category and the balance of the loan account. In some embodiments, the method further includes generating a billing statement containing an overall balance of the loan account, wherein the overall balance comprises a first interest portion based on the first interest rate and a second interest portion based on the second interest rate.

Some embodiments of the present invention provide a system including: a storage device having stored therein information relating to a loan account associated with a borrower, including a first interest rate associated with the loan account, computer readable program code stored on the storage device or a separate storage device, and a processor communicably coupled to the storage device or storage devices, wherein the computer readable program code includes instructions that when operated by said processor, causes the processor to segment the loan account into at least a first spend category, and associate a second interest rate with the first spend category, wherein the second interest rate is different from the first interest rate.

In some embodiments, the computer readable program code includes further instructions that when operated by the processor, causes the processor to identify a payment comprising a first portion based on the first interest rate and a second portion based on the second interest rate, and apply a first portion of the payment to reducing a balance of the first spend category. In some embodiments, the computer readable program code includes further instructions that when operated by the processor, causes the processor to apply a second portion of the payment to reducing a partial balance of the loan account, wherein the partial balance of the loan account does not include the balance of the first spend category.

In some embodiments, the system also includes a communication interface configured to receive an input from the borrower, and the computer readable program code includes further instructions that when operated by the processor, causes the processor to allocate the payment between the balance of the first spend category and the balance of the loan account according to the input from the borrower. In some embodiments, the computer readable program code includes further instructions that when operated by the processor, causes the processor to generate a billing statement containing an overall balance of the loan account, wherein the overall balance comprises a first interest portion based on the first interest rate and a second interest portion based on the second interest rate. In some embodiments, the processor is configured to segment the loan account into two or more spend categories and wherein the computer readable program code includes further instructions that when operated by said processor, causes the processor to allocate purchases made by the borrower to one of the two or more spend categories. In some embodiments, the computer readable program code includes further instructions that when operated by the processor, causes the processor to associate the purchase with a first spend category of the two or more spend categories, and record in connection with the first spend category an increase in a balance of the first spend category equal to the amount of the purchase.

Some embodiments of the present invention provide a computer program product comprising a computer-readable medium having computer-executable computer program code portions stored therein, wherein the computer-executable program code portions include: a first program code portion configured to store information relating to a HELOC account associated with a borrower, wherein a first interest rate is associated with the HELOC account, a second program code portion configured segment the HELOC account into at least a first spending category, and a third program code portion configured to associate a second interest rate with the first spending category, wherein the second interest rate is different from the first interest rate.

In some embodiments, the computer-executable program code portions further include a code portion configured to identify a payment comprising a first portion based on the first interest rate and a second portion based on the second interest rate, and a portion configured to apply a first portion of the payment to reducing a balance of the first spend category. In some embodiments, the computer-executable program code portions further include a code portion configured to apply a second portion of the payment to reducing a partial balance of the loan account, wherein the partial balance of the loan account does not include the balance of the first spend category. In some embodiments, the computer-executable program code portions further include a code portion configured to generate a billing statement containing an overall balance of the loan account, wherein the overall balance comprises a first interest portion based on the first interest rate and a second interest portion based on the second interest rate.

BRIEF DESCRIPTION OF THE DRAWINGS

Figure 1:
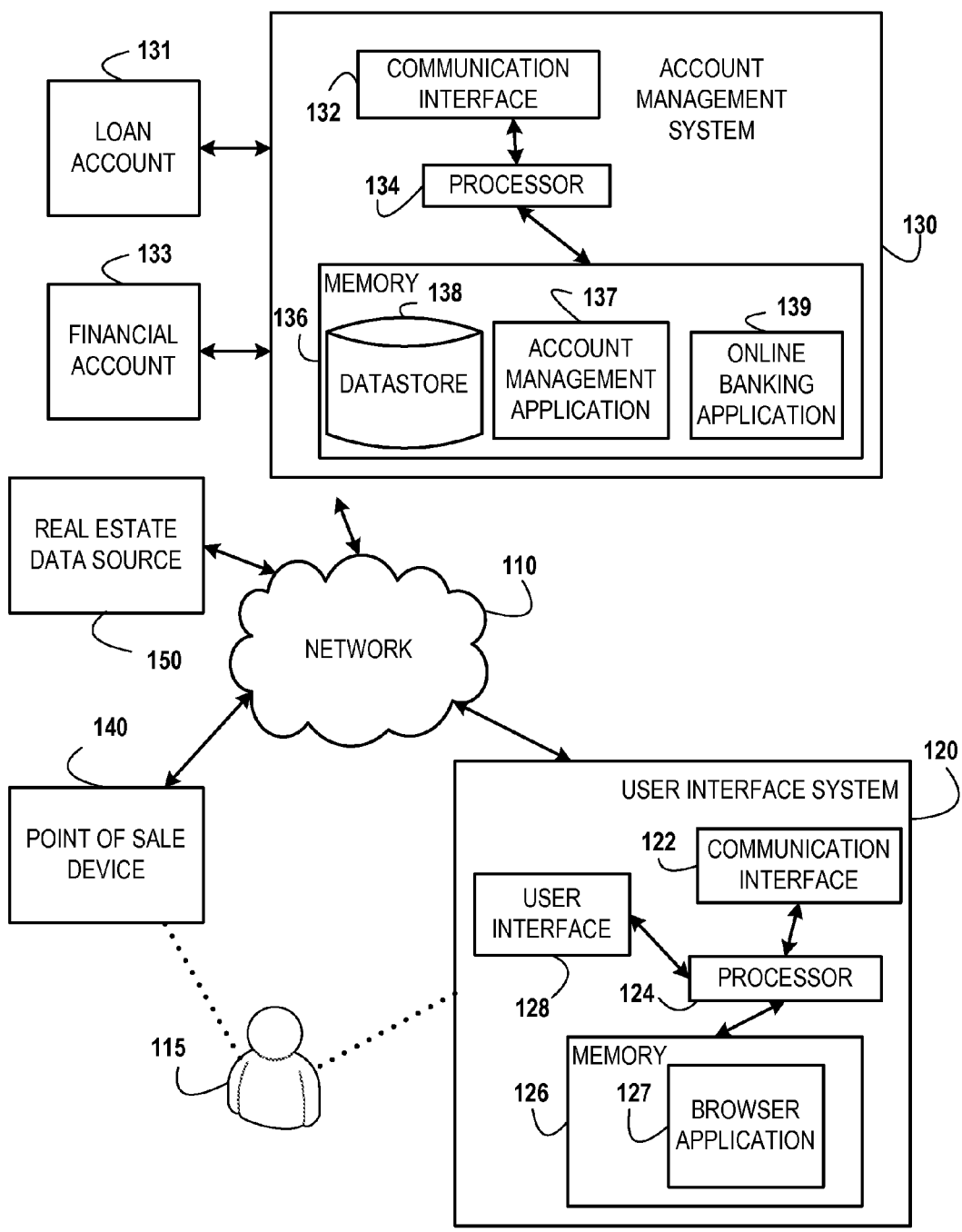
Figure 2A:
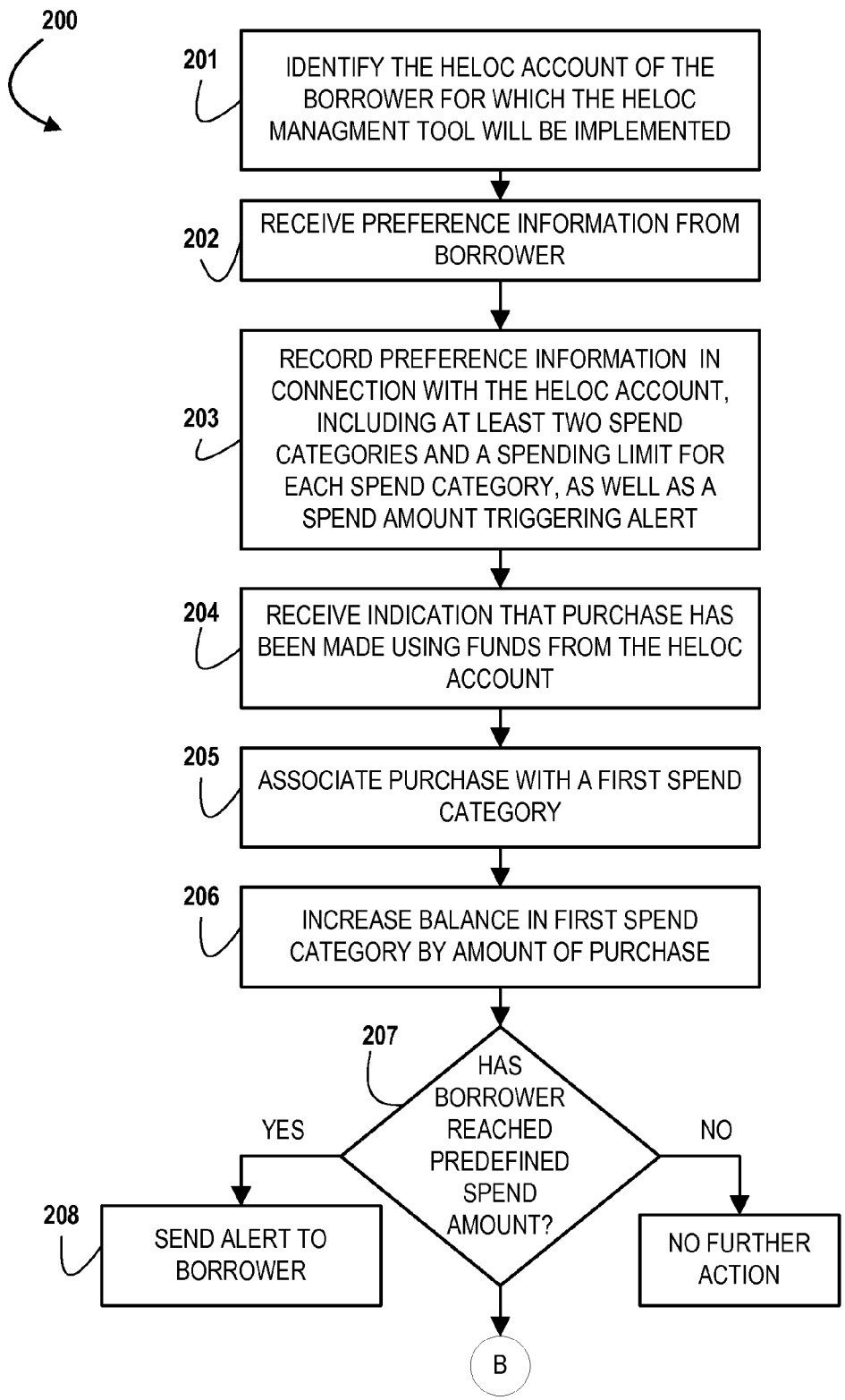
Figure 2B:
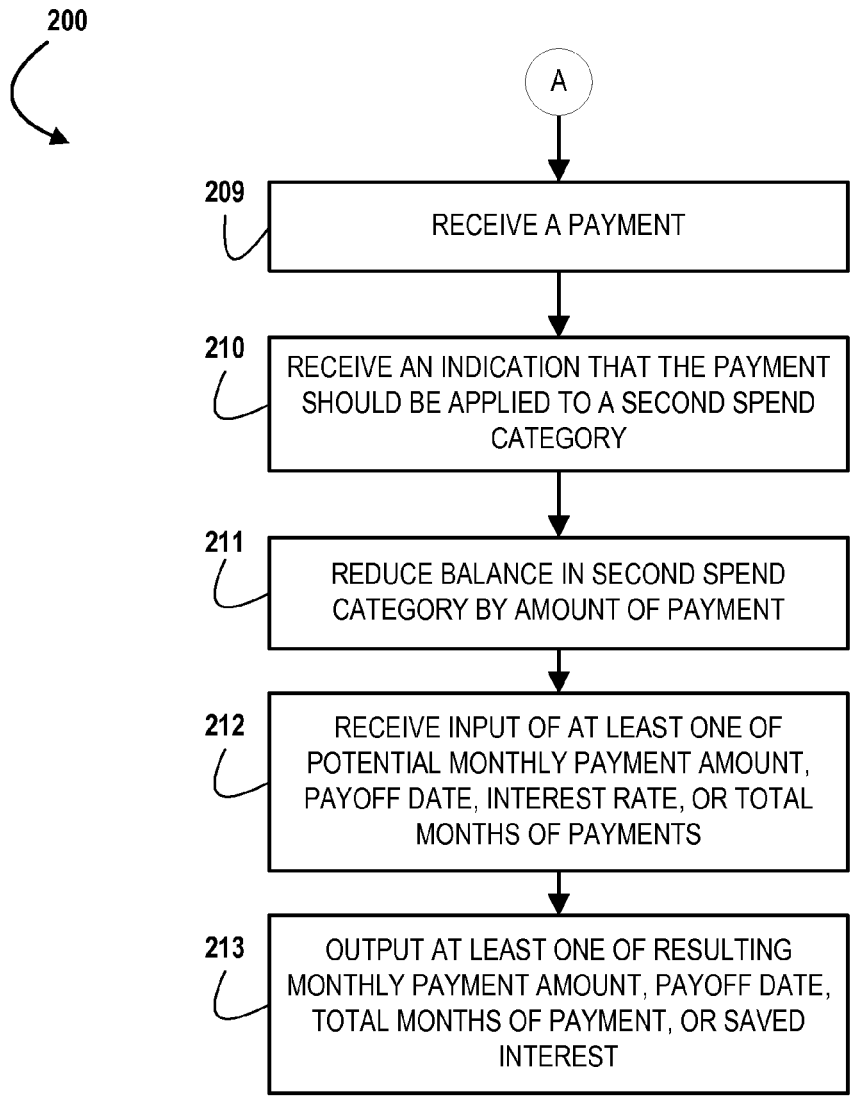
Figure 3:
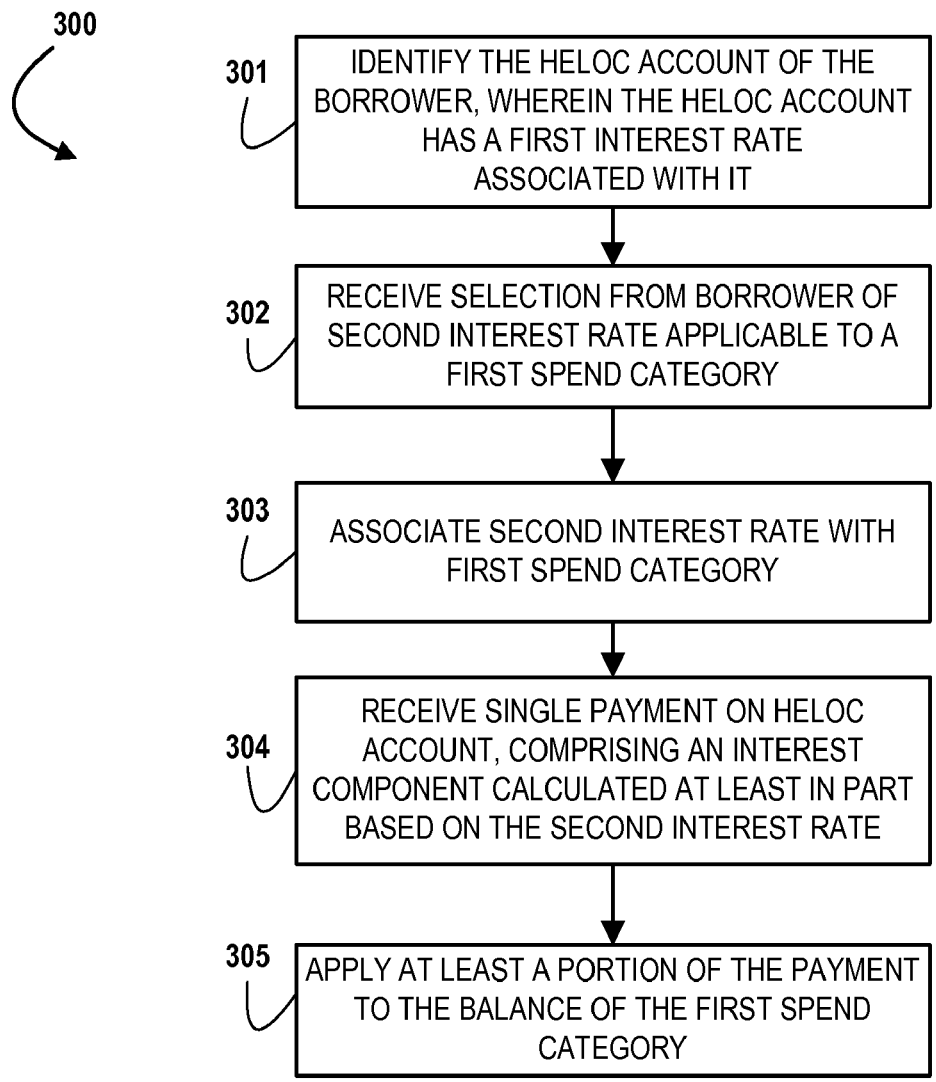
Figure 4:
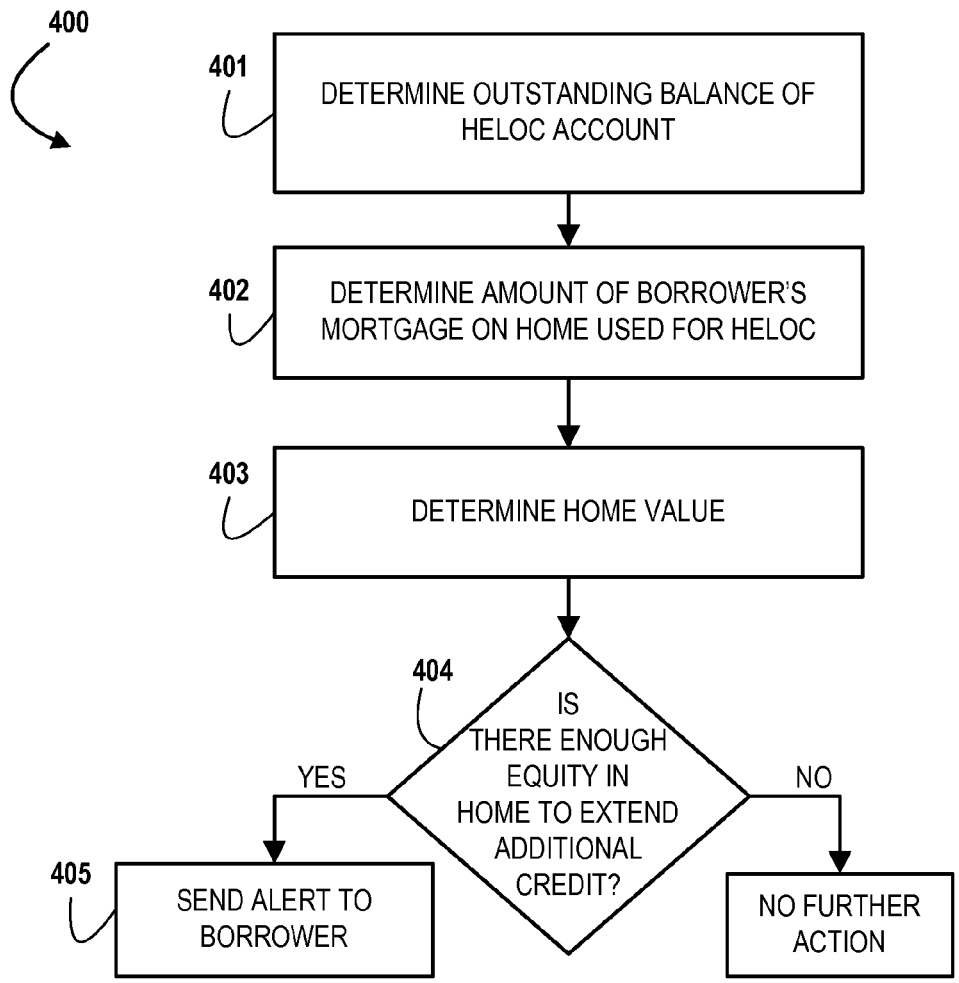

Having thus described embodiments of the present invention in general terms, reference will now be made to the accompanying drawings, wherein:

FIG. 1 is a block diagram illustrating technical components of a system for implementing a loan management tool, in accordance with an embodiment of the invention;

FIGS. 2A and 2B are flow diagrams illustrating a method of implementing a loan management tool, in accordance with an embodiment of the present invention;

FIG. 3 is a flow diagram illustrating a method of implementing a loan management tool is provided, in accordance with an embodiment of the present invention;

FIG. 4 is a flow diagram illustrating a method of implementing a loan management tool is provided, in accordance with another embodiment of the present invention; and FIGS. 5A, 5B, 6, 7A, 7B, 8A and 8B are exemplary outputs of a loan management system, according to one embodiment of the present invention.

DETAILED DESCRIPTION OF EMBODIMENTS OF THE PRESENT INVENTION

Embodiments of the present invention will now be described more fully hereinafter with reference to the accompanying drawings, in which some, but not all, embodiments of the present invention are shown. Indeed, the present invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and/or vice versa, unless explicitly stated otherwise. Also, as used herein, the term "a" and/or "an" shall mean "one or more," even though the phrase "one or more" is also used herein. Like numbers refer to like elements throughout.

As will be appreciated by one of ordinary skill in the art in view of this disclosure, the present invention may be embodied as an apparatus (including, for example, a system, machine, device, computer program product, and/or the like), as a method (including, for example, a business process, computer-implemented process, and/or the like), or as any combination of the foregoing. Accordingly, embodiments of the present invention may take the form of an entirely software embodiment (including firmware, resident software, micro-code, etc.), an entirely hardware embodiment, or an embodiment combining software and hardware aspects that may generally be referred to herein as a "system." Furthermore, embodiments of the present invention may take the form of a computer program product that includes a non-transitory computer-readable storage medium having computer-executable program code portions stored therein. As used herein, a processor may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out operations of the present invention may include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, etc.) that can direct a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator- and/or human-implemented steps in order to carry out an embodiment of the present invention.

Further, although many of the embodiments of the present invention described herein are generally described as involving a "financial institution," other embodiments of the present invention may involve one or more persons, organizations, businesses, and/or other entities that take the place of, or work in conjunction with, the financial institution to implement one or more of the embodiments described herein as being performed by the financial institution.

Disclosed herein are systems, methods, and computer program products for implementing loan management tools. It is contemplated that most, if not all, of the aspects of the various embodiments of the invention may be implemented for most loan products currently in use, as well as many new loan products that may be implemented in the future. For example, many aspects of the invention have applicability in a credit line type loan, such as a HELOC or a credit card. To provide a more complete understanding of the various aspects of the invention, the below disclosure describes the systems, methods, and computer program products of the present invention are described in relation to a HELOC account. It should be understood, however, that at least some aspects of the invention have more general applicability for other types of loans and should not be read as limited for only use in a HELOC loan account environment.

Referring now to FIG. 1, a system 100 for implementing a loan management tool is provided, in accordance with an embodiment of the present invention. As illustrated, the system 100 includes a network 110, a user interface system 120, an account management system 130, a point of sale device 140, and a real estate data source 150. FIG. 1 also illustrates a HELOC account 131 that provides a line of credit that can be drawn upon and a financial account 133 (such as a checking account) that can be used to pay for purchases or repay amounts to the HELOC account, which are operatively connected (e.g., communicably linked) to the account management system 130.

Also shown in FIG. 1 is a borrower 115 that has access to the user interface system 120 and the point of sale device 140. In some embodiments, the HELOC account 131 and the financial account 133 are associated with the borrower 115 such that the borrower 115 may draw funds from the HELOC account 131, deposit the funds drawn from the HELOC account 131 into the financial account 133, and use the financial account 133 to make purchases with the HELOC funds and make payments to the HELOC account 131. In some embodiments, the HELOC account 131 may be used directly by the borrower 115 to make purchases, for example, where the borrower has a payment card or checks issued in connection with the HELOC account 131 that draw upon the HELOC account 131 directly when used. According to other embodiments, the borrower 115 may be able to use the user interface system 120 to make purchases. For example, where the user interface system 120 is a mobile communications device, such as a mobile telephone, the device may be linked to the HELOC account 131 in such a manner that the device may be scanned or otherwise utilized in connection with the point of sale device 140 to make purchases directly from the HELOC account 131. Even where the purchases are not made directly from the HELOC account 131, the user interface system 120 or a mobile communications device distinct from the user interface system 120 may be utilized to make purchases. In such embodiments, the device may be linked to the financial account 133 and scanned or otherwise utilized in connection with the point of sale device 140 in order to effect payment from the financial account 133.

In the illustrated embodiment, the user interface system 120 is maintained by the borrower 115, the point of sale device 140 is maintained by a merchant (not shown), the real estate data source 150 may be maintained by a third party service provider or the financial institution, and the account management system 130, along with the HELOC account 131 and the financial account 133, are maintained by a financial institution (not shown). It will be understood that, according to some embodiments, the borrower 115 may use the HELOC account 131 and/or the financial account 133 to make one or more purchases from the merchant by using the point of sale device 140.

As shown in FIG. 1, the user interface system 120, the account management system 130, the point of sale device 140, and the real estate data source 150 are each operatively and selectively connected to the network 110, which may include one or more separate networks. In addition, the network 110 may include a local area network (LAN), a wide area network (WAN), and/or a global area network (GAN), such as the Internet. It will also be understood that the network 110 may be secure and/or unsecure and may also include wireless and/or wireline technology.

The user interface system 120 may include any computerized apparatus that can be configured to perform any one or more of the functions of the user interface system 120 described and/or contemplated herein. In some embodiments, for example, the user interface system 120 may include a personal computer system, a mobile phone, a personal digital assistant, a public kiosk, a network device, and/or the like. As illustrated in FIG. 1, in accordance with some embodiments of the present invention, the user interface system 120 includes a communication interface 122, a processor 124, a memory 126 having a browser application 127 stored therein, and a user interface 128. In such embodiments, the communication interface 122 is operatively and selectively connected to the processor 124, which is operatively and selectively connected to the user interface 128 and the memory 126.

Each communication interface described herein, including the communication interface 122, generally includes hardware, and, in some instances, software, that enables a portion of the system 100, such as the user interface system 120, to transport, send, receive, and/or otherwise communicate information to and/or from the communication interface of one or more other portions of the system 100. For example, the communication interface 122 of the user interface system 120 may include a modem, server, electrical connection, and/or other electronic device that operatively connects the user interface system 120 to another electronic device, such as the electronic devices that make up the account management system 130.

Each processor described herein, including the processor 124, generally includes circuitry for implementing the audio, visual, and/or logic functions of that portion of the system 100. For example, the processor may include a digital signal processor device, a microprocessor device, and various analog-to-digital converters, digital-to-analog converters, and other support circuits. Control and signal processing functions of the system in which the processor resides may be allocated between these devices according to their respective capabilities. The processor may also include functionality to operate one or more software programs based at least partially on computer-executable program code portions thereof, which may be stored, for example, in a memory device, such as in the browser application 127 of the memory 126 of the user interface system 120.

Each memory device described herein, including the memory 126 for storing the browser application 127 and other data, may include any non-transitory computer-readable medium. For example, memory may include volatile memory, such as volatile random access memory (RAM) having a cache area for the temporary storage of data. Memory may also include non-volatile memory, which may be embedded and/or may be removable. The non-volatile memory may additionally or alternatively include an EEPROM, flash memory, and/or the like. The memory may store any one or more pieces of information and data used by the system in which it resides to implement the functions of that system.

As shown in FIG. 1, the memory 126 includes the browser application 127. In some embodiments, the browser application 127 includes a web browser and/or some other application for communicating with, navigating, controlling, configuring, and/or using the account management system 130 and/or other portions of the system 100. For example, in some embodiments, the borrower 115 uses the browser application 127 to trigger and/or configure one or more aspects of the account management system 130 that relate to implementing the loan management tool of embodiments of the present invention. As another example, in some embodiments, the borrower 115 uses the browser application 127 to draw funds from the HELOC account 131 and transfer the funds to the financial account 133. As another example, in some embodiments, the borrower 115 uses the browser application 127 to create and/or select different categories of use for the HELOC funds, such as education, overdraft protection, home improvement projects, etc. As another example, in some embodiments, the borrower 115 uses the browser application 127 to set customized spending limits within each category such that the sum of all the spending limits does not exceed the credit limit of the HELOC account 131. As another example, in some embodiments, the borrower 115 uses the browser application 127 to review the spending history associated with the HELOC account 131 and/or the financial account 133, and track the spending against the customized spending limits in each category. As another example, in some embodiments, the borrower 115 uses the browser application 127 to determine the availability for additional credit to be added to the HELOC account 131. As yet another example, in some embodiments, the borrower 115 uses the browser application to make payments into the HELOC account 131 from the financial account 133.

In some embodiments, the borrower 115 uses the browser application 127 to access an online and/or mobile banking account (not shown) for configuring these one or more aspects of the account management system 130. In some embodiments, the user interface system 120 is a mobile device and the borrower 115 is able to manage his or her HELOC account 131 as described herein using the mobile device. In some embodiments, the browser application 127 includes computer-executable program code portions for instructing the processor 124 to perform one or more of the functions of the browser application 127 described and/or contemplated herein. In some embodiments, the browser application 127 may include and/or use one or more network and/or system communication protocols.

Also shown in FIG. 1 is the user interface 128. In some embodiments, the user interface 128 includes one or more user output devices, such as a display and/or speaker, for presenting information to the borrower 115 and/or some other user. In some embodiments, the user interface 128 includes one or more user input devices, such as one or more buttons, keys, dials, levers, directional pads, joysticks, accelerometers, controllers, microphones, touchpads, touchscreens, haptic interfaces, microphones, scanners, motion detectors, cameras, and/or the like for receiving information from the borrower 115 and/or some other user. In some embodiments, the user interface 128 includes the input and display devices of a personal computer, such as a keyboard and monitor, that are operable to receive and display information associated with offsetting a liability and/or accumulating rewards.

FIG. 1 also illustrates an account management system 130, in accordance with an embodiment of the present invention. The account management system 130 may include any computerized apparatus that can be configured to perform any one or more of the functions of the account management system 130 described and/or contemplated herein. In accordance with some embodiments, for example, the account management system 130 may include a computer network, an engine, a platform, a server, a database system, a front end system, a back end system, a personal computer system, and/or the like. In some embodiments, such as the one illustrated in FIG. 1, the account management system 130 includes a communication interface 132, a processor 134, and a memory 136, which includes an account management application 137, and online banking application 139, and a datastore 138 stored therein. As shown, the communication interface 132 is operatively and selectively connected to the processor 134, which is operatively and selectively connected to the memory 136.

It will be understood that the account management application 137 and the online banking application 139 can be configured to implement any one or more portions of any one or more of the methods described below and/or otherwise contemplated herein. For example, in some embodiments, the online banking application 139 is configured to utilize the communication interface 132 to provide online and/or mobile banking services to the borrower 115 via the network 110 at the user interface system 120, such as, for example, any of the online and/or mobile banking services described and/or contemplated herein, including services with respect to management of the HELOC account 131. As another example, in some embodiments, the account management application 137 is configured to execute instructions input by the borrower 115 via the user interface system 120 and communicated to the account management system 130 via the browser application 127 and the network 110. Thus, according to some embodiments, the account management application 137 is configured to segment the HELOC account 131 into a set of spend categories within the HELOC account 131 according to the instructions of the borrower 115, and as described in greater detail below. As another example, in some embodiments, the account management application 137 may be operable to process financial transactions, such as transfers and purchases, initiated by the borrower 115 and involving the HELOC account 131 and/or the financial account 133. In some embodiments, where the borrower 115 attempts to make a purchase with the HELOC account 131 or the financial account 133 at the point of sale device 140, the account management application 137 may be configured to approve a payment request from the point of sale device 140. Furthermore, in some embodiments, the account management application 137 is configured to track the spending of the borrower 115 based on the transactions that it processes and compare the spending to the spending limits set by the borrower 115, as described in greater detail below.

It will be understood, therefore, that in some embodiments, the account management application 137 and the online banking application 139 are configured to communicate with the datastore 138, the user interface system 120, the point of sale device 140, the real estate data source 150, and/or any one or more other portions of the system 100. For example, in some embodiments, the account management application 137 is configured to send payment authorization information to, and/or receive transaction data from, the point of sale device 140. As another example, in some embodiments, the account management application 137 is configured to receive data from the real estate data source 150 via the network 160 and use the data to calculate additional home equity available in the borrower's home. As another example, in some embodiments, the account management application 137 is configured to create and/or send one or more notifications to the borrower 115 at the user interface system 120 that explain, for example, that a payment is due, that a particular spending limit in a spend category has been exceeded or is likely to be exceeded, or that there is potential to add additional credit to the HELOC account 131. It will be further understood that, in some embodiments, the account management application 137 includes computer-executable program code portions for instructing the processor 134 to perform any one or more of the functions of the account management application 137 described and/or contemplated herein. In some embodiments, the account management application 137 may include and/or use one or more network and/or system communication protocols.

In some embodiments, the account management application 137 may be configured to utilize the communication interface 132 to receive information associated with the HELOC account 131 in any way and/or in any form. In some embodiments, the account management system 130 is configured to utilize the account management application 137 to manage the HELOC account 131 for the borrower 115 by, for example, drawing funds from the HELOC account 131 for the borrower 115, processing and/or posting transactions and purchases involving the HELOC account 131 and/or the financial account 133, segmenting the HELOC account 131 into spend categories and setting associated spending limits, tracking spending of HELOC funds by the borrower 115 against the recorded limits in each spend category, calculating the account balance for the HELOC account 131 overall and the balance in each spend category, receiving an input from the borrower 115 such as a potential or desired monthly payment or payoff date and calculating the minimum monthly payment due, the total interest to be paid and/or saved based on the monthly payment, and/or the payoff date for both the HELOC account 131 and the individual spend categories, implementing different interest rates in different spend categories based on the preferences of the borrower 115, tracking the value of the home and the equity of the home that is the collateral for the HELOC account 131, communicating account statements and predefined alerts to the borrower 115, processing a payment into the HELOC account 131 from the borrower 115, whether from the financial account 133 or otherwise, and/or the like.

In some embodiments, the online banking application 139 provides online and/or mobile services associated with the HELOC account 131 and the financial account 133 (e.g., online and/or mobile banking, etc.). For example, in some embodiments, the online banking application 139 provides the borrower 115 with access to his or her accounts maintained with the financial institution via the browser application 127 of the user interface system 120. Indeed, in some embodiments, the online banking application 139 operates an online banking platform including an online banking account associated with the borrower 115, which online banking account, when accessed by the borrower 115 can be used to manage the various accounts of the borrower 115 held by the financial institution. It will be further understood that, in some embodiments, the online banking application 139 includes computer-executable program code portions for instructing the processor 134 to perform any one or more of the functions of the online banking application 139 described and/or contemplated herein. In some embodiments, the online banking application 139 may include and/or use one or more network and/or system communication protocols.

In addition to the account management application 137 and the online banking application 139, the memory 136 also includes the datastore 138. In some embodiments, the datastore 138 includes information associated with the HELOC account 131 and the financial account 133, including, for example, account names, persons and/or entities associated with the HELOC accounts, addresses associated with the HELOC account 131 and the financial account 133, transaction data and/or transaction history associated with the HELOC account 131 and the financial account 133, information input by the borrower 115 and relating to the HELOC account 131, including information about the spend categories and spending limits, information about the desired monthly payments or payoff dates for the HELOC account 131 and the spend categories, and/or any other type and/or amount of information. In some embodiments, the datastore 138 is configured to store any information relating to implementing a loan management tool as described herein. In some embodiments, the datastore 138 stores information associated with online and/or mobile banking.

It will be understood that the datastore 138 may include any one or more storage devices, including, but not limited to, datastores, databases, and/or any of the other storage devices typically associated with a computer system. It will also be understood that the datastore 138 may store information in any known way, such as, for example, by using one or more computer codes and/or languages, alphanumeric character strings, data sets, figures, tables, charts, links, documents, and/or the like. Further, in some embodiments, the datastore 138 may include information associated with one or more applications, such as, for example, the account management application 137 or the online banking application 139. It will also be understood that, in some embodiments, the datastore 138 provides a substantially real-time representation of the information stored therein, so that, for example, when the processor 134 accesses the datastore 138, the information stored therein is current or substantially current. It will be understood that the embodiment illustrated in FIG. 1 is exemplary and that other embodiments may vary. For example, in some embodiments, the account management system 130 includes more, less, or different components, such as, for example, an account manager (e.g., financial institution employee) user interface.

It will be understood that the HELOC account 131, according to some embodiments, is an account for a revolving line of credit extended to the borrower 115 where the limit is determined by using the borrower's equity in his or her home as collateral. It will be understood that, although much of the description herein refers to accounts held by individuals, the HELOC account 131 may be held by one or more individuals, such as a HELOC account held jointly by husband and wife or parent and child. According to some embodiments, the HELOC account 131 provides the borrower 115 with the ability to draw funds from the HELOC account 131 up to the determined credit limit during a specified period, with drawn amounts bearing interest until repayment, the interest rate generally being a variable rate. Depending on the financial institution managing the HELOC account 131, it may or may not be possible for the borrower 115 to utilize the HELOC account 131 directly to make purchases. For example, in some instances, the financial institution may issue a payment card to the borrower 115 that may be used to make purchases where payment for the items purchased comes from drawing the appropriate amount from the HELOC account 131. However, according to other embodiments, the HELOC account 131 may not be utilized to directly make purchases. In such embodiments, the borrower 115 must draw the funds as cash or transfer them to another account in order to begin spending.

According to some embodiments, the financial account 133 may be and/or include any type of account that can have funds transferred into and out of it and that can be used to make purchases. In one embodiment, the financial account 133 is a checking account. Also, it will be understood that the financial account 133 may be held by one or more individuals, families, households, social networks, businesses (e.g., corporations, business units within corporations, small businesses, for profit organizations, non-profit organizations, etc.), and/or other entities. Additionally, it will be understood that, in some embodiments, the financial account 133 includes two or more accounts. Thus, in some embodiments, the borrower 115 may wish to utilize two or more financial accounts in order to dispose of the funds drawn from the HELOC account 131 or to make payments to the HELOC account 131. In some embodiments, both of these accounts are owned, controlled, serviced, managed, operated, and/or maintained (collectively referred to herein as "maintained" for simplicity) by a single financial institution. According to some embodiments, the borrower 115 may set up the financial account 133 such that it is an account only to be used in connection with funds from the HELOC account 131. This may be particularly beneficial for budgeting purposes in those situations where the HELOC account 131 is not configured to be used for direct purchases.

It should be understood that, in some embodiments, some or all of the portions of the system 100 may be combined into a single portion. Specifically, in some embodiments, the user interface system 120 and the account management system 130 are combined into a single user interface and account management system configured to perform all of the same functions of those separate portions as described and/or contemplated herein. Likewise, in some embodiments, some or all of the portions of the system 100 may be separated into two or more distinct portions. Specifically, in some embodiments, the account management system 130 may be separated into a financial account datastore system configured to store and/or manage transaction data and user input data, including data relating to spend categories and spending limits, and a HELOC management system configured to draw funds from the HELOC account 131 and execute payments and transfers of funds among the accounts, track spending of HELOC funds against the stored limits, calculate and apply interest to the accounts, and communicate with the account holder. In addition, the various portions of the system 100 may be maintained for by the same or separate parties. For example, as previously mentioned, a single financial institution may maintain the HELOC account 131, the financial account 133, and the account management system 130. However, in other embodiments, the HELOC account 131, the financial account 133, and/or the account management system 130 may each be maintained by separate entities.

It will also be understood that the system 100 may include and/or implement any embodiment of the present invention described and/or contemplated herein. For example, in some embodiments, the system 100 is configured to implement any one or more of the embodiments of the method 200 described and/or contemplated herein in connection with FIGS. 2A and 2B, any one or more of the embodiments of the method 300 described and/or contemplated herein in connection with FIG. 3, and any one or more of the embodiments of the method 400 described and/or contemplated herein in connection with FIG. 4.

Referring now to FIG. 2A, a method 201 of implementing a loan management tool is provided, in accordance with one embodiment of the present invention. As represented by the block 210, the account management system 130 first identifies a loan account associated with the borrower 115, such as a HELOC account 131, for which the management tool will be implemented. According to some embodiments, the borrower 115 utilizes the user interface system 120 to communicate to the account management system 130, via the communication interface 122 and the network 110, identifying information about the HELOC account 131. For example, in some embodiments, the borrower 115 uses the browser application 127 to access the online and/or mobile banking services offered by the financial institution through the account management system 130 utilizing the online banking application 139. In such embodiments, the online banking application 139 allows the borrower 115 to utilize available online and/or mobile banking services, such as an online banking account associated with the borrower 115 that provides access to the borrower's various financial accounts held by the financial institution, including the HELOC account 131 and the financial account 133, to select the HELOC account 131 for viewing and management via the user interface 128.

According to some embodiments, the HELOC account 131 may be identified at any time that the HELOC account 131 is active in order to implement the loan management tool. In one embodiment, identification of the HELOC account 131 occurs at the same time that the borrower initially opens the HELOC account. In some embodiments, the borrower 115 does not utilize the user interface system 120 to select the HELOC account 131, but rather communicates to the financial institution a desire to implement the loan management tool for the HELOC account 131 in a different manner, such as in person or via telephone, email, letter, etc. In such embodiments, the financial institution uses the identifying information provided by the borrower 115 to identify the HELOC account 131.

Next, as represented by the block 202, the account management system 130 receives budgeting preference information from the borrower 115. In some embodiments, the account management system 130 utilizes the online banking application 139 to provide the borrower 115 with access to his or her HELOC account 131 such that the borrower 115 can check balances, payments, and interest, conduct transfers, and input certain information, among other activities. Therefore, according to some embodiments, the borrower 115 utilizes the browser application 127 and the user interface system 120 to access his or her online banking account and the HELOC account 131 in particular, and input into the account management system 130 the borrower's budgeting preference information. For example, once the HELOC account 131 has been identified by the account management system 130 and opened in online banking for viewing and management by the borrower 115, the account management system 130 may give the borrower 115 the option of defining and/or selecting particular spend categories applicable to the HELOC account 131. As used herein, "spend categories" refer to the spend categories in which the borrower 115 intends to use funds drawn from the HELOC account 131, such as education, debt consolidation, home improvement, medical bills, miscellaneous expenditures or cash, etc. Therefore, according to some embodiments, the spend categories offer a methodology for categorizing spending of the borrower's available HELOC funds in order to implement a budgeting strategy with respect to the HELOC account 131. According to some embodiments, the borrower 115 defines and/or selects at least one spend category for the HELOC account 131 and defines and/or selects a spending limit for that spend category according the borrower's specific budget. According to other embodiments, the borrower 115 defines and/or selects at least two spend categories for the HELOC account 131 and defines and/or selects a spending limit for each of the at least two spend categories according the borrower's budget.

Figure 5A:
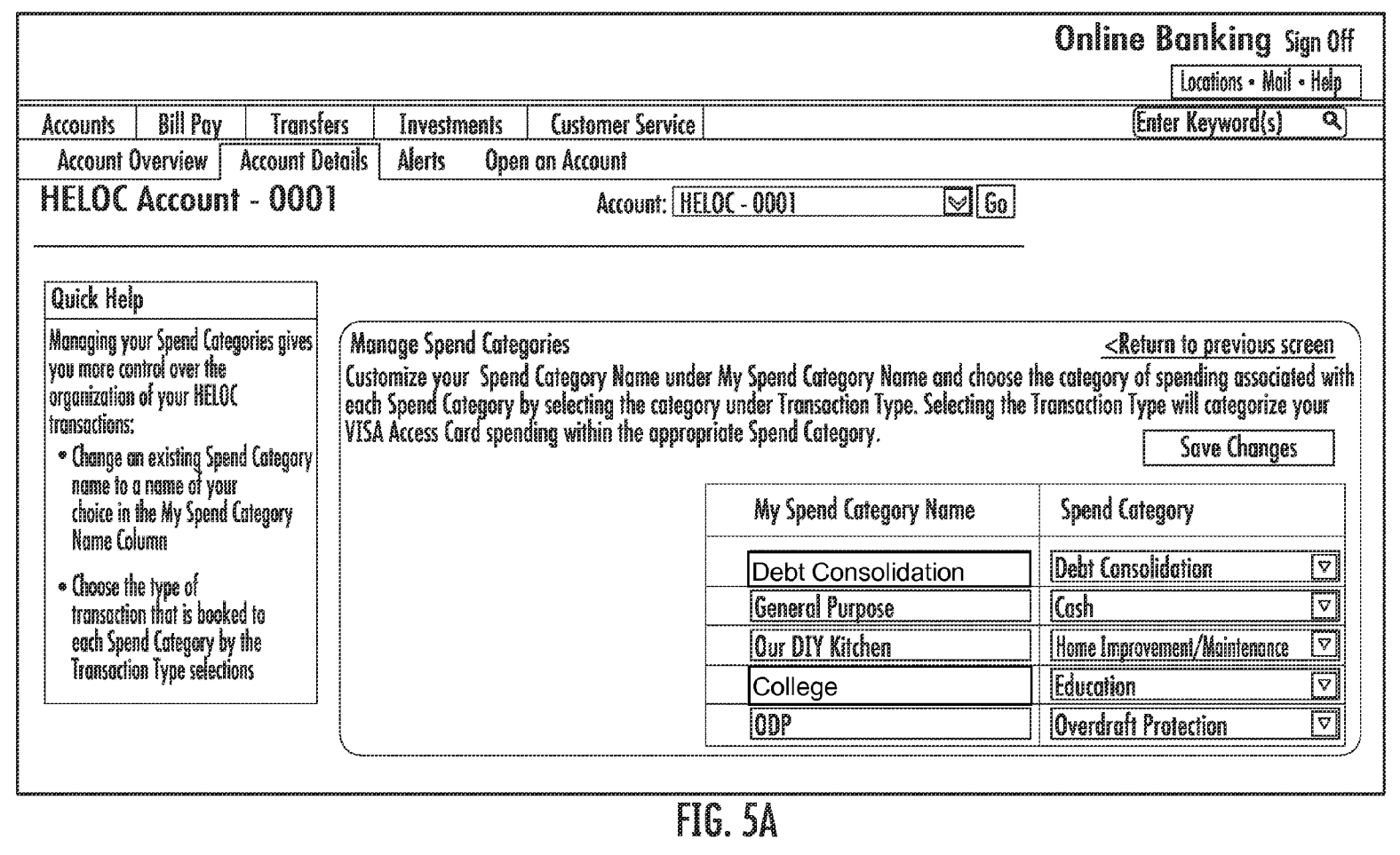

Thus, according to some embodiments, the borrower 115 may access the HELOC account 131 via the browser application 127 by utilizing the online and/or mobile banking services of the financial institution provided by the account management system 130 through use of the online banking application 137, and define and/or select the appropriate spend categories and associated spending limits. Referring now to FIGS. 5A and 5B, exemplary outputs of the account management application 137 visible to the borrower 115 via the user interface 128 when the borrower has accessed his or her HELOC account via online banking provided by the online banking application 139. FIGS. 5A and 5B demonstrate the manner in which the spend categories and limits may be input into and/or updated in the account management system 130 are provided, according to one embodiment of the present invention. As shown in FIG. 5A, the borrower 115 may use the user interface 128 to enter in an identifying name for each spend category. Once names for the spend categories have been entered, when the borrower 115 accesses the HELOC account 131 via online banking and chooses to view his or her spend categories, the borrower 115 may be presented with the various spend categories of the HELOC, as named by the borrower. In addition to naming each spend category, as shown in FIG. 5A, the borrower 115 may select the particular spend category for the named spend category, i.e. education, cash or miscellaneous expenses, medical expenses, etc. This information will assist the account management application 137 in identifying transactions that fall within particular spend categories so that tracking progress on the budget of the spend categories may automated and up-to-date, as described in greater detail below.

As shown in FIG. 5B, the borrower 115 may also enter spending limits applicable to each selected spend category, according to one embodiment of the present invention. Thus, as shown in FIG. 5B, for a HELOC having a $200,000 credit limit, the borrower may apportion the total $200,000 among the different spend categories, for example, $100,000 to a general purpose spend category, $25,000 to a debt consolidation spend category, $35,000 to a home remodeling project spend category, $30,000 to a college expenses spend category, and $10,000 to an overdraft protection spend category. In some embodiments, the sum of the spend limits entered for each selected spend category will equal the total credit limit of the HELOC account 131. It should be understood that FIGS. 5A and 5B provide only one example of the manner in which the budgeting preference information may be entered into the account management system 130, and other methods may be utilized, including communicating the preference information to the financial institution in person, by telephone, email, or other communication method.

In some embodiments, the budgeting preference information input by the borrower 115 may also include preference information regarding alerts and notifications to be sent to the borrower. For example, in some embodiments, the borrower 115 may record a preference that he or she receive an alert in the event the borrower 115 either reaches or is within a predefined amount away (whether an absolute number or a percentage of the overall spending limit) the credit limit of the HELOC and/or the spending limit of one or more spend categories. According to other embodiments, the borrower 115 may elect to receive an alert in the event a payment is missed, the applicable interest rate (whether on the overall HELOC or a particular spend category) increases above a predefined rate, the overall interest due on the HELOC or a particular spend category reaches a predefined minimum, or upon any other occurrence that the borrower 115 desires to know about or be reminded. According to still other embodiments, the borrower 115 may input a preference to receive notification if and when the borrower is eligible to add additional credit to the HELOC account 131, for example, due to increasing home equity. The foregoing and other preferences regarding alerts and notifications may be input into the account management system 130 as part of the budgeting preference information. Indeed, according to some embodiments of the present invention, the alert and notification settings are highly configurable by the borrower 115 such that the borrower 115 may elect to receive notifications or alerts upon the occurrence of any of countless events.

Referring again to FIG. 2A, as represented by the block 203, according to some embodiments, the account management system 130 stores the received budgeting preference information, including identifying information for at least two spend categories and the associated spending limits for such spend categories, in the datastore 138 in connection with information relating to the HELOC account 131. In some embodiments, this information is stored in the datastore 138 such that it can be used by the account management application 137 to track the spending of the borrower 115 using funds from the HELOC account 131 against the specified spending limits and spend categories selected by the borrower 115. According to some embodiments, the account management system 130 segments the HELOC account 131 into one or more spend categories, and sets spending limits associated with the spend categories. In some embodiments, as funds drawn from the HELOC account 131 are spent by the borrower 115, the spend categories will acquire balances that are a component of the overall balance of the HELOC account 131. Thus, by segmenting the HELOC account 131, the account management system creates conceptual subaccounts within the overall HELOC account that have their own balances. In addition, as discussed further below, the borrower 115 may choose to apply different payment strategies to different spend categories such that the balances on certain spend categories are paid off sooner than others.

In this regard, according to some embodiments, and as represented by the block 204, the account management system 130 receives an indication that a purchase has been made using funds from the HELOC account 131. The account management system 130 may be configured to receive this indication in a number of different ways. In some embodiments, the borrower 115 may communicate to the account management system 130 that a particular purchase was made using funds from the HELOC account 131, whether by using the user interface 128 and the online banking application 139 or by other communication methods. Thus, in some embodiments, the borrower 115 may make a purchase using the financial account 133, whether by payment card, check, mobile communications device, or other, where funds in the financial account were drawn from the HELOC account 131. The borrower 115 may then access his or her online banking account, which may include both the financial account 133 and the HELOC account 131, via the browser application 127, and locate the record of the purchase within the financial account 133 and use this record to link the purchase to the HELOC account 131 such that the purchase is recorded as an expenditure relating to the HELOC account 131. The foregoing method may be utilized, for example, in those circumstances where the borrower 115 is unable to make purchases directly from the HELOC account 131 and the financial account 133 is not funded solely by drawing upon the HELOC account 131.

In other embodiments, the account management system 130 is configured to automatically recognize that certain purchases that it processes for the borrower 115 have been made using funds from the HELOC account 131. For example, in some embodiments, the borrower 115 is able to make purchases using the HELOC account 131 directly, for example, by using a payment card or checks issued by the financial institution or a mobile communications device containing an application provided by the financial institution that draw upon the HELOC account 131 each time they are used to make purchases. Alternatively, in some embodiments, even if the HELOC account 131 may not be used to directly make purchases, the borrower 115 has established the financial account 133 as an account that will be funded exclusively with funds drawn from the HELOC account 131. This arrangement may be communicated to the financial institution and stored in the memory 136 of the account management system 130 in relation to both the financial account 133 and the HELOC account 131. In such embodiments, every time that the financial account 133 is used to make a purchase, the account management system 130, utilizing the account management application 137, determines that the purchase was made using funds from the HELOC account 131.

In some embodiments, the account management system 130 is configured to process the purchase by debiting the HELOC account 131 or the financial account 133 associated with the borrower 115 when it receives a payment request from the point of sale device 140, for example, when the purchase is made using a payment card associated with the HELOC account 131 or the financial account 133. In such embodiments, by processing the purchase made by the borrower 115 by drawing funds from the HELOC account 131 or debiting the financial account 133, the account management system 130 can determine that the purchase was made using funds from the HELOC account 131. Thus, in such embodiments, the indication that a purchase was made using funds from the HELOC is simply the payment processing information that is sent to the account management system 130 from the point of sale device 140.

Next, as represented by the block 205 and according to some embodiments of the present invention, the account management system 130 utilizes the account management application 137 to associate the purchase with a particular spend category. In those embodiments where the purchase is attributed to the HELOC account 131 based on a communication or other indication from the borrower 115, the borrower 115 may also indicate the particular spend category that the purchase relates to. For example, the borrower 115 may input into the account management system 130 via online banking an indication that a purchase of general contracting services made using the financial account 133 was made with HELOC funds and should be attributed to the pre-selected home improvement spend category. Indeed, the borrower 115 may attribute a purchase made using HELOC funds to the appropriate spend category at any time, either through online banking or through other communication with the financial institution, whether the purchase was made using the HELOC account 131, the financial account 133, or otherwise.

According to other embodiments, the account management system 130 may automatically determine, based on information from the point of sale device 140, the spend category to which the purchase relates. For example, in the event the purchase is made using the HELOC account 131 or the financial account 133 (where the financial account is funded exclusively by HELOC funds) at an educational institution or the purchase is a payment to an educational lender, the account management system 130 will automatically associate the purchase with the spend category for education. Because the account management system 130 is processing the payment, it receives certain information about the identity of the vendor/recipient of the payment. This information is analyzed by the account management application 137, which is configured to determine from the given information the nature of the purchase (as used herein, a "purchase" includes any type of payment made using the HELOC funds), and assign the purchase to a particular spend category. Thus, the account management system 130, utilizing the account management application 137, is configured to categorize the purchases made using funds from the HELOC account 131 within the spend categories of the borrower-defined spend categories.

As represented by the block 206, according to some embodiments of the present invention, once the correct spend category has been determined based on the nature of the purchase made, the amount of the purchase is added to the outstanding balance of that spend category. Just as the sum of the spending limits for the spend categories adds up to the total credit limit of the HELOC account 131, according to some embodiments, the sum of the outstanding balances for the spend categories adds up to the total outstanding balance for the HELOC account 131. Thus, the spend categories serve to break down the overarching HELOC into conceptual sub-accounts for the purposes of budgeting and managing spending of the HELOC funds. For example, each individual spend category within the HELOC account 131 has its own spending limit, as set by the borrower 115, and its own outstanding balance, based on the total amount of purchases made using HELOC funds that fall within that spend category. Furthermore, as described in greater detail below, each spend category may have its own interest rate and payment terms associated with it, including monthly payment amount and anticipated payoff date. The borrower 115 may utilize online banking to view the status of the individual spend categories with regard to outstanding balance, remaining available funds, etc., and determine how the borrower's spending and payments affect both the individual spend categories selected by the borrower as well as the overall HELOC.

Figure 6:
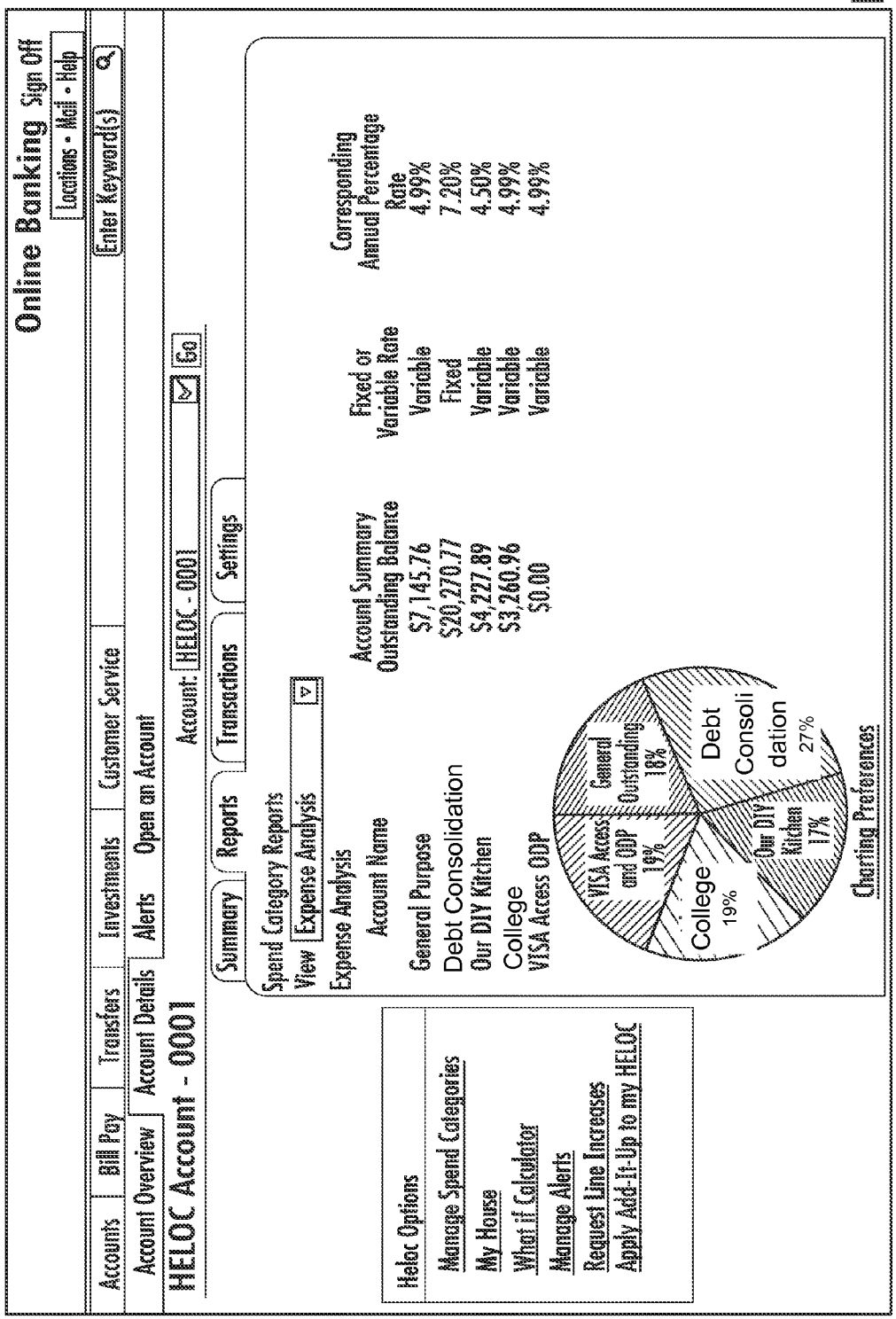

Referring now to FIG. 6, an exemplary output of the account management application 137 presenting an analysis of the spending of HELOC funds by spend categories is provided. The output of FIG. 6 may be visible to the borrower 115 via the user interface system 120 when the user has accessed online banking to view and/or manage his or her HELOC account 131. As shown in FIG. 6, the account management system 130 maintains records for the outstanding balance for each defined spend category. This allows the borrower 115 to easily determine how well the borrower 115 is staying within budget, or, in other words, how close the borrower is to the predefined spending limit for each spend category, as well as learn his or her spending patterns and where the funds from the HELOC account 131 have thus far been spent, regardless of how they were allocated.

Referring again to FIG. 2A, once the purchase has been correctly assigned to a spend category by the account management system 130, whether automatically or at the direction of the borrower 115, and the balance and available funds of the spend category have been adjusted accordingly, as represented by the block 207, the account management system 130 determines if the borrower has met or exceeded the predefined spend amount in that spend category (or the spending has reached a level where it is within a certain amount or amounts to a certain percentage of the spend limit for such spend category) such that an alert to the borrower is triggered. According to some embodiments, the determination of whether an alert is to be sent to the borrower 115 is based on the preference information previously provided by the borrower 115 and stored in the datastore 138. Alternatively, the account management system 130 may have default alert settings that provide for alerts in certain situations even if not specially selected by the borrower 115. In the event that the predefined spend amount in the particular spend category has been met or exceeded, the account management system 130, according to some embodiments and as represented by the block 208, communicates an alert to the borrower 115 providing notification of this fact. In some embodiments, the alert may be transmitted to the user interface system 120 via the network 110. In other embodiments, the alert may be posted to the online banking account of the borrower 115 such that the borrower will view the alert the next time he or she accesses the HELOC account 131 via online banking.

Referring now to FIG. 2B, according to some embodiments and as represented by the block 209, the account management system 130 receives a payment on the HELOC account 131. As represented by the block 210, the account management system 130 further receives an indication that the payment is associated with a particular spend category. For example, the borrower 115 may submit a payment to the HELOC account 131 from the financial account 133 using the browser application 127 and the online banking application 139. At the time the borrower 115 submits the payment, the borrower may indicate that the payment is to be applied to one or more spend categories within the HELOC account 131. For example, the borrower 115 may allocate a certain portion of the payment to a first spend category and another portion of the payment to a second spend category. In some embodiments, the account management application 137 and the online banking application 139 make it possible for the borrower to make selections regarding the allocation of the payment among the spend categories at the time that the payment is submitted.

Once the correct spend category or spend categories to apply the payment have been determined, according to some embodiments and as represented by the block 211, the account management system 130 reduces the outstanding balance of the chosen spend categories by the amount of the payment that was directed to such spend categories. Thus, according to some embodiments, just as spending may be broken down across the spend categories for management, the payments may be allocated among the spend categories at the discretion of the borrower 115. For example, the borrower 115 may determine that 100% of a particular payment will be applied to the education spend category. While the allocation may be purely conceptual in some embodiments, as the overall balance and remaining credit in the HELOC account 131 will not differ regardless of which spend category receives the payment, providing borrowers with the ability to allocate their payments in this manner advantageously allows borrowers to more easily implement their own budgeting strategies, as they can pay down certain spend categories in order to earn the ability to spend more in such category according to their budget.

According to some embodiments of the present invention, the account management system 130 is configured to provide the borrower 115 with assistance and education in determining how to manage the HELOC account 131 and the various chosen spend categories within the HELOC account 131. Thus, as represented by the block 212, the account management system 130 receives an input that includes at least one of a potential monthly payment amount, potential payoff date, potential interest rate, or potential total months of payments. In some embodiments, the borrower 115 utilizes the online banking application 139 via the browser application 127 to query the account management application 137 as to what effect the provided input would have on the terms applicable to the overall HELOC account 131 or one or more spend categories therein. Indeed, the input provided by the borrower 115 may apply to a spend category or may apply to the overall HELOC. In response to the input, according to some embodiments and as represented by the block 213, the account management system 130, utilizing the account management application 137, will return at least one of the resulting monthly payment amount, payoff date, total months of payment, or total saved interest. Thus, the account management system 130 utilizes the term input by the borrower 115 to determine what the remaining terms of the loan would be if the borrower 115 adhered to the input term.

As an example, the borrower 115 may enter into the account management system 130 in relation to a particular spend category or the overall HELOC a desired monthly payment amount. The account management application 137 will use this information to determine a payoff date, the total number of months that payments may be made, and/or the total amount of interest saved by the payoff date, in the event the proposed monthly payment amount is not an interest-only payment. The account management application 137 will utilize the online banking application 139 to present these results to the borrower 115 via the borrower's online banking account. As another example, the borrower 115 may enter into the account management system 130 a proposed interest rate and a payment term that will apply to a particular spend category. The account management application 137 will use the proposed interest rate and term to calculate the monthly payments that will be required to pay off the spend category balance. The account management system 130 will present these results to the borrower 115.

Referring now to FIGS. 7A and 7B, exemplary outputs of the account management system 130 with regard to the just-described steps are provided. As shown in FIG. 7A, according to some embodiments, the borrower 115 may select a particular spend category within the HELOC account 131 and enter the months to pay, payment amount each month, or payoff date. The account management application 137 will calculate the saved interest and the remaining terms not entered by the borrower 115 and the account management system 130 will present these calculated results to the borrower 115 via online banking. As shown in FIG. 7B, the borrower may allocate the monthly payment amount for the overall HELOC account 131 among the various defined spend categories.

Referring now to FIG. 3, a method 300 of implementing a loan management tool is provided, in accordance with one embodiment of the present invention. As represented by the block 301, the account management system 130 identifies the HELOC account 131 of the borrower 115. As described above, identification may take place based on information input by the borrower 15 into the online banking application 139 or otherwise communicated to the financial institution by the borrower 115.

According to some embodiments, the HELOC account 131 has a first interest rate and a first term associated with it. With regard to the interest rate, most HELOC accounts are offered by lenders to borrowers with a variable interest rate that is based on the prime rate. This interest rate will apply to all funds drawn from the HELOC by the borrowers such that the borrowers must pay back the amount drawn plus interest on the amount drawn calculated using the relevant interest rate. With regard to the term, a HELOC account is generally extended to a borrower with a particular term, or draw period, specified. The term is therefore the period during which the borrower may draw funds from the HELOC, and at the conclusion of the term, all funds, plus all accrued interest, must be repaid to the lender. Thus, the first interest rate applicable to the HELOC account 131 is the interest rate that will apply to the funds drawn from the HELOC account 131 by the borrower 115, and the first term is the time period during which the borrower 115 may draw funds from the HELOC account 131. At expiration of the first term, all funds drawn from the HELOC, and all interest accrued on those funds, must be repaid into the HELOC account 131.

As represented by the block 302, according to some embodiments, the account management system 130 receives an indication from the borrower 115 that the borrower 115 requests that a second interest rate and a second term apply to a particular spend category within the HELOC account 131. The borrower 115 may utilize the user interface system 120 to communicate this desire to the account management system 130, including by utilizing the browser application 127 of the user interface system 120 to access the online banking services provided by the online banking application 139 of the account management system 130. Thus, the borrower 115 wants the debt within a particular spend category to have different terms attached to the repayment of funds drawn from the HELOC account 131 that are spent within that spend category. For example, in the event the prime rate is increasing, the borrower 115 may wish to tie off one piece of debt, such as an education spend category, to avoid the variable interest rate applicable to the overall HELOC account 131. As another example, the borrower 115 may desire to pay off the HELOC funds used for a home improvement spend category at an earlier time than the time when all funds drawn from the HELOC account 131 become due (at expiration of the first term), so that the debt associated with that spending is closed out earlier and more equity may be returned to the home. Therefore, according to some embodiments, the borrower 115 communicates a request that different repayment terms apply to a particular spend category within the HELOC account 131.

As represented by the block 303, in some embodiments, the account management system 130 responds to the request from the borrower 115 by associating a second interest rate with the spend category. Therefore, rather than generating an entirely separate account that is a subaccount of the overall HELOC account, which would necessitate separate statements and separate payments by the borrower 115, the second interest rate is imposed on the first spend category without constructing a separate account. However, instead of the spend category being a conceptual construction used by the financial institution in order to assist the borrower with implementing budgeting, spending, and payment strategies as discussed previously, in this instance, the first spend category becomes an actual subsection of the overall HELOC account 131 whose balance is treated differently from the remaining balance of the HELOC account 131. In particular, the second interest rate applies to the balance of the first spend category while the first interest rate applies to the remaining balance of the HELOC account 131, wherein the remaining balance of the HELOC account does not include the balance of the first spend category.

According to some embodiments, and as represented by the block 304, a payment is received by the account management system 130 that is directed to the HELOC account 131 and that comprises an interest component that was calculated at least in part based on the second interest rate. In some embodiments, the payment comprises a first portion based on the first interest rate and a second portion based on the second interest rate. The first portion is used to pay down the remaining balance in the HELOC account (i.e. the balance not associated with or attributable to the spend category) while the second portion is used to pay down the balance of the first spend category. Thus, according to some embodiments and as represented by block 305, at least a portion of the payment is applied to the first spend category. According to some embodiments, the allocation of the payment between the first spend category balance and the remaining HELOC account 131 balance is made in accordance with rules stored in the memory 136 of the account management system 130. For example, the rules may include a direction to apply the payment first to pay the interest components of both the first spend category balance and the remaining HELOC account 131 balance. Once the interest components are paid, any portion of the payment remaining may be applied to the balance of the first spend category and the remaining balance of the HELOC account 131 in any proportion. In some embodiments, these rules were communicated to the account management system 130 by the borrower 115. In other embodiments, the allocation of the payment may be made in accordance with an instruction from the borrower 115, such as at the time of payment. For example, where the first interest rate is higher than the second interest rate, the payment may be allocated such that the payment is first directed to satisfying any outstanding balance that is based on the first interest rate, then directed to satisfying any outstanding balance that is based on the second interest rate.

Referring now to FIG. 4, a method 400 of implementing a loan management tool is provided, in accordance with one embodiment of the present invention. In some embodiments, the loan management tool is configured to identify a HELOC account associated with a home, determine a current equity value associated with the home, and generate a notification that additional credit may be added to the HELOC account. As part of determining the borrower's current equity in the home, according to some embodiments, the account management system 130 determines the total debt and credit held by the borrower that is secured by the home as collateral. In addition, the account management system 130 determines the current market value of the home that is being used as collateral. The difference between these two values may be used to determine if additional credit may be added to the HELOC account 131. As represented by the block 401, the account management system 130, utilizing the account management application 137, determines the credit limit of the HELOC account 131. This information should be stored in the datastore 138 in connection with the HELOC account 131. Next, as represented by the block 402, the account management system 130 determines the amount of the mortgage that the borrower 115 has on the home used as collateral for the HELOC account 131. This may be accomplished in a number of ways. First, where the mortgage is maintained by the same financial institution as the HELOC account 131, the account management system 130 may have direct access to the relevant information about the mortgage, indeed, it may be stored in the memory 136 of the account management system 130. In other embodiments, the account management system 130 may interface via the network 110 with the real estate data source 150, whether the holder of the mortgage or otherwise, that can provide the account management system 130 with continuous or periodic data feeds containing the information about the borrower's mortgage.

Figure 8A:
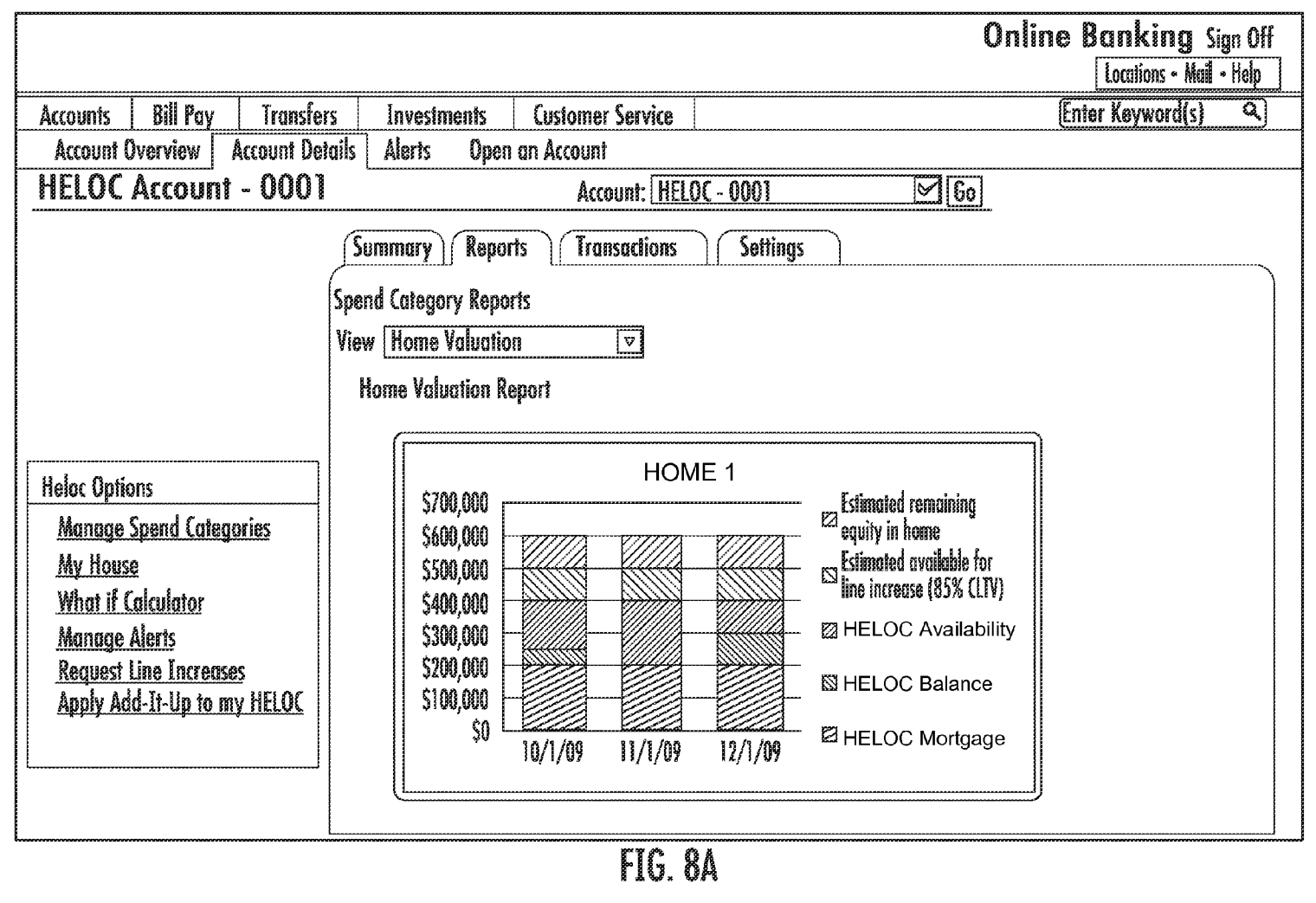

In some embodiments, as represented by the block 403, the account management system 130 determines the value of the home. In particular, according to some embodiments, the account management application 137 is configured to instruct the communication interface 132 of the account management system 130 to interface with the real estate data source 150 to obtain the estimated home value for the home used by the borrower 115 as collateral for the HELOC account 131. It may obtain this data on a continuous or periodic basis, or on demand of the borrower 115, for example, when the borrower makes a request via online banking that the account management system determine if additional credit may be added to the HELOC account 131. Next, as represented by the block 404, the account management system 130 compares the home value to the mortgage and the HELOC, and applies any applicable rules of the financial institution (i.e. the borrower must retain a certain amount of equity in the home) to determine if additional credit can be extended to the borrower 115. In the event the account management system determines that additional credit is available, according to the alert preferences stored by the borrower 115 in connection with the HELOC account 131, this information will be communicated to the borrower 115. In this regard, referring now to FIGS. 8A and 8B, exemplary outputs of the account management system 130 are provided. As shown in FIGS. 8A and 8B, the account management system 130 may track and present to the borrower 115 an updated accounting of the borrower's mortgage, HELOC (both outstanding balance and liability), and home value. Furthermore, the account management system 130 may present to the borrower 115 the results of its calculations as to whether there is any availability for an increase to the credit limit of the HELOC account 131.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A computer-implemented method comprising:
   storing information relating to a loan account associated with a borrower in a storage device, wherein a first interest rate and a first term is associated with the loan account;
   segmenting the loan account into at least a first spend category;
   receiving a request from a borrower that a second interest rate and a second term apply to the first spend category;
   associating, performed by a computing device processor, the second interest rate and the second term with the first spend category, wherein the second interest rate is different from the first interest rate;
   allocating, performed by the computing device processor, a purchase made by the borrower to one of one or more spend categories, wherein the one or more spend categories comprises the first spend category, wherein allocating the purchase comprises:
   receiving an indication that the purchase has been made using funds drawn from the loan account;
   associating the purchase with an associated spend category of the one or more spend categories; and
   recording in connection with the associated spend category an increase in a balance of the associated spend category equal to an amount of the purchase;
   receiving a payment comprising a first portion based on the first interest rate, a second portion based on the second interest rate, and instructions on how to apply a remainder of the payment;
   determining, performed by the computing device processor, a first interest component for the loan account based on the first interest rate, the first term, and an account balance for the loan account;
   determining, performed by the computing device processor, a second interest component for the first spend category based on the second interest rate, the second term, and the balance of the first spend category;
   applying the payment to the loan account and the first spend category so that the first interest component and the second interest component are completely paid before applying the remainder; and
   applying the remainder of the payment according to the instructions.

2. The method of claim 1, further comprising:
   determining a value of an asset associated with the loan account;
   comparing the value of the asset to outstanding debt associated with the asset, wherein the outstanding debt comprises the loan account; and
   determining whether additional credit may be provided to the borrower based on the comparison of the value of the asset to the outstanding debt associated with the asset.

3. The method of claim 1, wherein the instructions are stored in connection with the loan account prior to receipt of the payment.

4. The method of claim 1, further comprising:
   generating a billing statement containing an overall balance of the loan account, wherein the overall balance comprises a first interest portion based on the first interest rate and a second interest portion based on the second interest rate.

5. The method of claim 1, wherein receiving an indication that a purchase has been made comprises receiving the indication from a device effectuating the purchase.

6. The method of claim 5, wherein associating the purchase comprises associating the purchase with one of the one or more spend categories based on information provided by the device.

7. The method of claim 1, wherein associating the purchase comprises associating the purchase with one of the one or more spend categories based on input received from the borrower.

8. The method of claim 1, wherein segmenting the loan account into at least a first spend category comprises segmenting the loan account into one or more spend categories where one of the spend categories is one of education, home improvement, debt consolidation, miscellaneous, and medical bills.

9. The method of claim 1, further comprising:
   setting in connection with each spend category a spending limit; and
   generating a notification to the borrower when the difference between a balance of one of the one or more spend categories and the spending limit for the spend category is zero or is less than a predefined amount.

10. The method of claim 1, further comprising:
    receiving from the borrower an input; and
    calculating, based on the input, an output, wherein the output comprises at least one of an anticipated payoff date, a monthly payment amount, and a total saved interest.

11. The method of claim 10, wherein receiving from the borrower the input comprises receiving at least one of a desired payoff date, a desired monthly payment amount, and a desired total saved interest.

12. The method of claim 1, wherein the loan account is a line of credit account.

13. The method of claim 1, wherein the loan account is a HELOC account.

14. A computer-implemented method comprising:
    storing information relating to a loan account associated with a borrower in a storage device, wherein a first interest rate and a first term is associated with the loan account;
    segmenting the loan account into at least a first spend category;
    receiving a request from a borrower that a second interest rate and a second term apply to the first spend category;
    associating, performed by a computing device processor, the second interest rate and the second term with the first spend category, wherein the second interest rate is different from the first interest rate;

receiving instructions from the borrower regarding allocating a payment between a balance of the first spend category and a balance of the loan account;

receiving a payment comprising a first portion based on the first interest rate and a second portion based on the second interest rate;

determining, performed by the computing device processor, a first interest component for the loan account based on the first interest rate, the first term, and an account balance for the loan account;

determining, performed by the computing device processor, a second interest component for the first spend category based on the second interest rate, the second term, and the balance of the first spend category;

applying the payment to the loan account and the first spend category so that the first interest component and the second interest component are completely paid before applying the remainder;

applying, performed by the computing device processor, the first portion of the payment to reducing the balance of the loan account, wherein the balance of the loan account does not include the balance of the first spend category according to the instructions; and applying, performed by the computing device processor, the second portion of the payment to reducing the balance of the first spend category according to the instructions.

15. The method of claim 14, further comprising:
generating a billing statement containing an overall balance of the loan account, wherein the overall balance comprises a first interest portion based on the first interest rate and a second interest portion based on the second interest rate.

16. A system comprising:
a storage device comprising stored therein information relating to a loan account associated with a borrower, including a first interest rate and a first term associated with the loan account;
computer readable program code stored on said storage device or a separate storage device; and
a processor communicably coupled to said storage device or storage devices,
wherein said computer readable program code comprises instructions that when operated by said processor, causes said processor to:
  segment the loan account into at least a first spend category;
  receive a request from a borrower that a second interest rate and a second term apply to the first spend category;
  associate the second interest rate with the first spend category, wherein the second interest rate is different from the first interest rate;
  allocate a purchase made by the borrower to one of one or more spend categories, wherein the one or more spend categories comprises the first spend category;
  associate the purchase with an associated spend category of the one or more spend categories;
  record in connection with the associated spend category an increase in a balance of the associated spend category equal to an amount of the purchase;
  receive instructions from the borrower regarding allocating a payment between the balance of the first spend category and a balance of the loan account;
  receive a payment comprising a first portion based on the first interest rate and a second portion based on the second interest rate;
  determine a first interest component for the loan account based on the first interest rate, the first term, and an account balance for the loan account;
  determine a second interest component for the first spend category based on the second interest rate, the second term, and the balance of the first spend category;
  applying the payment to the loan account and the first spend category so that the first interest component and the second interest component are completely paid before applying the remainder;
  apply the first portion of the payment to reducing the balance of the loan account, wherein the balance of the loan account does not include the balance of the first spend category according to the instructions; and
  apply the second portion of the payment to reducing the balance of the first spend category according to the instructions.

17. The system of claim 16, wherein said computer readable program code comprises further instructions that when operated by said processor, causes said processor to:
generate a billing statement containing an overall balance of the loan account, wherein the overall balance comprises a first interest portion based on the first interest rate and a second interest portion based on the second interest rate.

18. A computer program product comprising a non-transitory computer-readable medium having computer-executable computer program code portions stored therein, wherein the computer-executable program code portions comprise:
a code portion configured to store information relating to a loan account associated with a borrower, wherein a first interest rate and a first term is associated with the loan account;
an additional program code portion configured to segment the loan account into at least a first spend category;
an additional program code portion configured to receive a request from a borrower that a second interest rate and a second term apply to the first spend category;
an additional program code portion configured to associate the second interest rate with the first spend category, wherein the second interest rate is different from the first interest rate;
an additional program code portion configured to allocate a purchase made by the borrower to one of one or more spend categories, wherein the one or more spend categories comprises the first spend category;
an additional program code portion configured to receive an indication that the purchase has been made using funds drawn from the loan account;
an additional program code portion configured to associate the purchase with an associated spend account of the one or more spend categories;
an additional program code portion configured to record in connection with the associated spend category an increase in a balance of the associated spend category equal to an amount of the purchase
an additional program code portion configured to receive instructions from the borrower regarding allocating a payment between a balance of the first spend category and a balance of the loan account;
an additional program code portion configured to determine a first interest component for the loan account based on the first interest rate, the first term, and the balance for the loan account;
an additional program code portion configured to determine a second interest component for the first spend category based on the second interest rate, the second term, and the balance of the first spend category;
an additional program code portion configured to apply the payment to the loan account and the first spend category so that the first interest component and the second interest component are completely paid before applying the remainder;
an additional program code portion configured to apply a first portion of the payment to reducing the balance of the first spend category; and
an additional program code portion configured to apply a second portion of the payment to reducing the balance of the loan account, wherein the balance of the loan account does not include the balance of the first spend category, wherein the first portion of the payment and the second portion of the payment are applied according to the instructions.

19. The computer program product of claim 18, wherein the computer-executable program code portions further comprise: a fourth program code portion configured to generate a billing statement containing an overall balance of the loan account, wherein the overall balance comprises a first interest portion based on the first interest rate and a second interest portion based on the second interest rate.

* * * * *